March 11, 1969  A. EISENMAN  3,431,755
MOTOR VEHICLE LOCK
Filed Feb. 16, 1967  Sheet 1 of 3
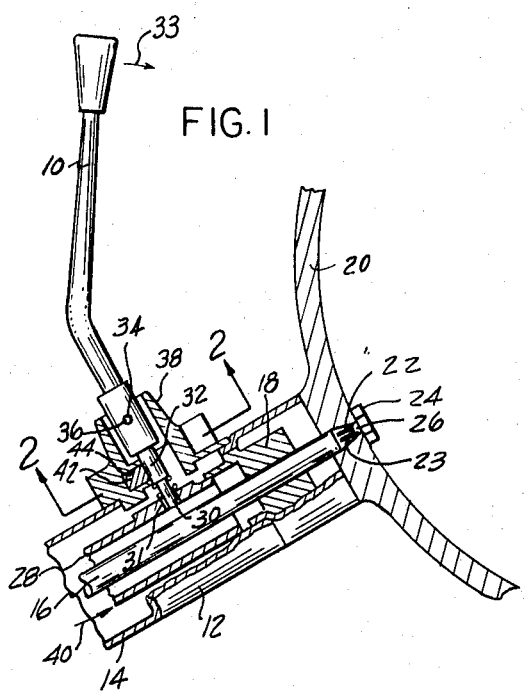
INVENTOR
ARNOLD EISENMAN
BY Hauke, Krass, & Gifford
ATTORNEYS

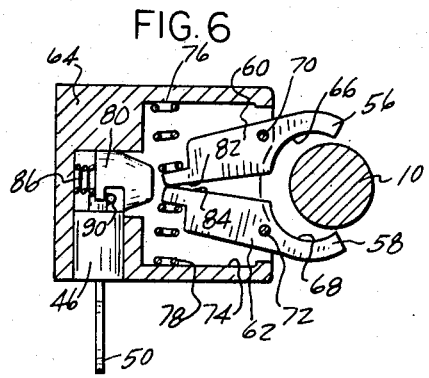
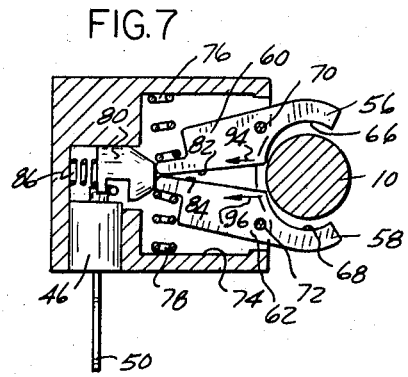
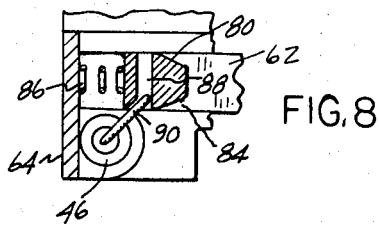
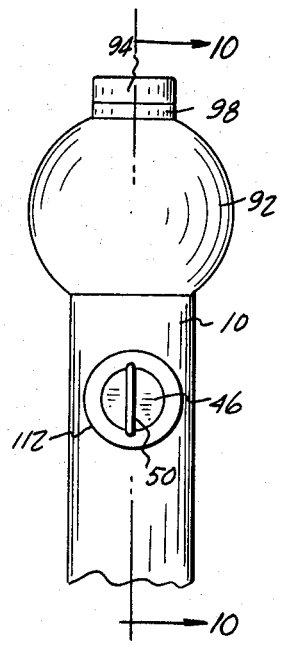
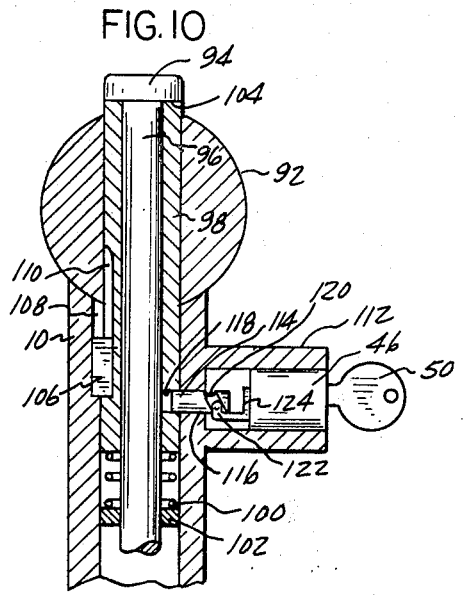

INVENTOR
ARNOLD EISENMAN
BY *Hauke, Krass, & Gifford*
ATTORNEYS

United States Patent Office 3,431,755
Patented Mar. 11, 1969

3,431,755
MOTOR VEHICLE LOCK
Arnold Eisenman, 18636 Cherrylawn,
Detroit, Mich. 48221
Filed Feb. 16, 1967, Ser. No. 616,522
U.S. Cl. 70—181                                                    3 Claims
Int. Cl. G05g 5/00; B60r 25/06; E05b 65/12

ABSTRACT OF THE DISCLOSURE

A locking mechanism for preventing the control or shift lever of a motor vehicle from being manually displaced from a latched position to an unlatched position permitting the lever to shift the transmission by angular displacement to predetermined positions. A restraining member is engaged with a portion of the lever or with the unlatching means to hold the lever in a latched position when a lock, to which the restraining member is operatively connected, is locked. When the lock is unlocked the restraining member is disengaged from the lever or from the latching means and permits the lever to be unlatched.

Background of the invention

The present invention relates to transmission locks for motor vehicles, and more particularly to a locking mechanism which, when locked, holds the transmission control lever from being displaced, to a position permitting the motor vehicle to be driven. In its preferred form, the present invention provides a motor vehicle having a so-called "automatic" transmission with a locking mechanism which, when locked, holds the transmission control lever in the "park" position, such that the motor vehicle is positively immobilized. The lock cooperating with the locking mechanism of the invention must be unlocked by a person having an appropriate key corresponding to the code combination of the lock, prior to freeing the control lever for subsequent displacement to any one of its drive range positions.

In one of its aspects, the present invention is particularly adapted to motor vehicle automatic transmissions wherein the control lever is mounted on the steering column of the vehicle and is angularly positionable along a quadrant to various driving mode positions such as, reverse, neutral, drive, low, or the like, from a nondriving "park" position. In such transmission control lever arrangements, there are means provided for latching the control or shift lever at each of its driving positions, such latching means requiring the lever to be angularly displaced towards the driver and about a first fulcrum point against a spring bias in order to unlatch the lever prior to angularly displacing the lever about a second fulcrum having its axis substantially normal to the axis of the lever latching fulcrum. The locking mechanism of the invention provides for a wedging member engaging a portion of the lever and preventing the unlatching motion thereof.

In another of its aspects, the present invention provides for clamping means normally holding the shifting lever in the "park" position when locked, and releasing the lever for motion to any one of the driving mode angular positions, irrespective of whether the lever must be unlatched or not prior to releasing the lever for such motion to the driving positions. Additionally, the present invention provides for automatic means for automatically clamping the shifting lever in such "park" position any time the lever is brought back to such position, such that the lever is positively immobilized each time it is brought back to such "park" position.

In another of its aspects, for applications with motor vehicle transmission control lever of the so-called floor mounted type or console type in which the control lever is disposed in a housing mounted on the floor of the vehicle between the driver and the front seat passenger, such control lever being usually provided with a manually releasable latching element, the invention provides means preventing, when locked, the release of such latching means prior to angularly displacing the lever to any one of the appropriate driving positions.

Motor vehicles presently available are so designed that their imperviousness to theft or to being driven without the owner's permission leaves much to be desired. The only anti-theft devices provided as "original equipment" are the door locks and the lock for the ignition switch, which is usually combined with the starter motor relay switch, such that, when the ignition lock is unlocked by means of an appropriate key, the motor vehicle engine may be started. The same key often fits the door locks and the ignition lock, although, in some makes of motor vehicles, different keys must be used for the door locks and for the ignition lock. As a result of providing such vulnerable anti-theft devices for motor vehicles, motor vehicles may be easily started and the unauthorized use and driving away of motor vehicles can be easily effected by way of a jumper wire connected to the appropriate terminals of a locked ignition switch so as to short circuit the normally open switch contacts of the ignition switch when the switch is locked. The present invention provides an anti-theft device which, although it may be combined with the lock for the ignition switch if so desired, provides additional positive safeguards against unauthorized use of a motor vehicle by positively holding the motor vehicle transmission control lever in a non-driving position, preferably in the "park" position wherein, as is well known, the propeller shaft of the motor vehicle is positively immobilized by means such as a pawl or a dog locking the shaft against rotation.

Transmission control lever locking mechanisms have been known in the past as disclosed, for example, in U.S. Patents Nos. 1,622,839, 1,662,099, 1,681,017, 1,769,137, 1,863,742, 1,903,017, and 2,046,379, among others. However such devices are often complex and they require important structural modification to be incorporated in the transmission mechanism; they are difficult to adapt to already existing vehicles, and they are expensive to manufacture and prohibitive in cost. By contrast, the present invention provides motor vehicle transmission locking mechanisms that include few parts, which may be manufactured at low cost, which require little or no modification to existing motor vehicles, which may be designed for and incorporated into motor vehicles during manufacture with practically no modification of existing transmissions, and which may be mounted on already existing motor vehicles.

Objects and advantages of the present invention will become more clearly apparent when the description of a few examples of preferred embodiments thereof is considered in conjunction with the accompanying drawings wherein:

Brief description of the drawings

FIGURE 1 is a partial longitudinal sectional view showing in a schematic manner an example of an embodiment of a motor vehicle transmission control lever locking mechanism according to the present invention;

FIGURE 2 is a sectional view substantially along line 2—2 of FIGURE 1, with the locking mechanism locked;

FIGURE 3 is a view similar to FIGURE 2, but showing the locking mechanism unlocked;

FIGURE 4 is a top plan elevational view of another example of an embodiment according to the present invention;

FIGURE 5 is a transverse sectional view substantially along line 5—5 of FIGURE 4, showing the locking mechanism in a locked state;

FIGURE 6 is a view similar to FIGURE 5, but showing the locking mechanism in an unlocked state;

FIGURE 7 is a view similar to FIGURE 6, but showing the operation of the device when the transmission control lever is returned, for example, to the "park" position;

FIGURE 8 is a partial longitudinal sectional view as seen from line 8—8 of FIGURE 5;

FIGURE 9 is a partial elevational view of a further example of a locking mechanism according to the invention;

FIGURE 10 is a partial sectional view along line 10—10 of FIGURE 9;

Description of the preferred embodiments

Figure 11:
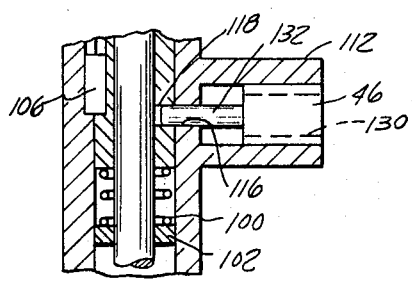
FIGURE 11 is a modification of the embodiment of FIGURES 9–10, showing the locking mechanism in a locked state.

An example of conventional motor vehicle transmission control lever mechanisms, as shown in FIGURES 1 and 2, generally includes, a control or shifting lever 10 supported in an annular housing 12 mounted on the steering column jacket 14 of the motor vehicle. Annular housing 12 has a limited range rotation capability with respect to the steering column jacket 14 around a first axis coinciding with the steering column axis. Within the steering column jacket is disposed, in the usual manner, a steering column shaft 16 capable of journalling in bearing block 18 under the action of steering wheel 20, mounted on the end thereof by means of, for example, tapered splined end 22 on the end of shaft 16 engaging a correspondingly tapered and splined bore 23 in the hub of the steering wheel. A nut 24 cooperating with reduced diameter threaded end portion 26 of the steering shaft 16 holds the steering wheel on the end of the shaft 16.

The motor vehicle transmission, not shown, may be shifted to any one of different driving modes, such as reverse, neutral, forward drive, slow and low, for example, by means of a shifting sleeve 28 disposed around steering shaft 16 within steering column jacket 14 and rotatable relatively thereto within a limited angular range, in coordination with annular housing 12 being rotated relatively to the steering column jacket 14 by means of lever 10 whose reduced diameter end 30 engages a peripheral aperture 31 in the sleeve 28. The steering column jacket 14 may include a quadrant ratchet arrangement, not shown, engageable by the end 32 of the lever 10, end 32 being urged at all times by means of a spring bias for engagement with a slot of the ratchet quadrant such that annular housing 12 is normally immobilized in predetermined angular positions. The ratchet arrangement is such that lever 10 must be first angularly displaced in the direction of arrow 33 in order to disengage its end 32 from a ratchet quadrant notch for the purpose of unlatching annular housing 12 for subsequent angular positioning of annular housing 12 and corresponding rotation of shifting sleeve 28 to the selected driving range position of the transmission. To permit such an unlatching motion, lever 10 is capable of angular displacement around fulcrum pivot 34 defined by a pin 36, or the like, passing through an appropriate transverse aperture in the lever and pivotally holding the lever with respect to a boss 38 disposed in annular housing 12 and surrounding the lever where it projects through the annular housing 12 with the end 32 of the lever disposed toward the interior thereof.

Alternately, as shown more clearly in FIGURE 1, shifting sleeve 28 is biased normally in the direction of arrow 40 and must first be longitudinally displaced against such bias by the action of reduced diameter end portion 30 of lever 10 engaging aperture 31 in the sleeve 28 so as to unlatch sleeve 28 for subsequent rotation by means of lever 10.

As shown in FIGURES 1–2, the present invention, in one of its aspects, provides a wedging member or block 42 slidably disposed in a keyway or slot 44 in annular housing 12, wedging member 42 being normally adapted to engage the peripheral surface of end portion 32 of lever 10, such as to normally prevent the unlatching angular motion of lever 10 in the direction of arrow 33, for preventing the motor vehicle transmission from being shifted to any one of the driving range positions. Wedging member 42 is held in the locking position of FIGURE 2 by means of a lock such as cylinder lock 46 having a plug, not seen, on the end of which is mounted an eccentric member 48 engaging an appropriate recess 49 in the wedging member 42. When lock 46 is unlocked by means of a key such a key 50 and the plug of the lock is rotated relatively to the housing thereof by rotation of key 50, eccentric member 48 causes wedging member 42 to be displaced to the position shown in FIGURE 3, thus no longer engaging end 32 of lever 10 and freeing the lever such that it can be displaced in the direction of arrow 33 for unlatching the transmission control and permitting housing 12 to be rotated together with shifting sleeve 28 to any appropriate driving range position.

FIGURES 4–8 illustrate another example of an embodiment of the present invention which represents, as compared to the embodiment of FIGURES 1–3, the advantage of being subject to incorporation into a motor vehicle transmission control system without any modification whatsoever of the original structure, and which further presents the advantage of being operational even with transmission system designs wherein the control lever is adapted to be displaced only in a plane to diverse positions corresponding to the various driving ranges, without first requiring the shifting or control lever to be unlatched, as in the embodiment of FIGURES 1–3, prior to subsequent motion to one of the various driving range positions.

As represented more clearly in FIGURES 4–5, a transmission shifting or control lever 10 projects from an annular housing 12 rotatable around a steering column 14. As shown, the lever 10 is capable of occupying any one of a variety of angular positions corresponding to "park," or to various driving modes, and the position occupied by the control lever 10 is visually displayed by means such as index pointer 52 displaced along a dial 54 indicating the diverse functions of the transmission resulting from the angular position of the lever. As shown, dial 54 indicates P for park, R for reverse, N for neutral, D for drive, S for slow or "super" and L for low. In the position indicated in FIGURE 4, the control lever 10 is angularly positioned so as to place the motor vehicle transmission in a "park" mode, as shown by index pointer 52 being indexed with letter P of dial 54. In this position, a portion of lever 10 is engaged between the bifurcated arcuate end portions 56 and 58, as best seen in FIGURE 5, of two symmetrically disposed clamp members 60 and 62 projecting from a housing 64. Housing 64 is attached by means such as by mounting brackets, not shown, to a portion of the interior or of the dashboard of the motor vehicle or, alternately, housing 64 may be clamped in any appropriate manner and position on the vehicle steering column jacket 14. The projecting bifurcated ends 56 and 58 of clamp members 60–62 are provided with concave arcuate inner faces 66 and 68, respectively, adapted to encircle and engage a portion of the peripheral surface of lever 10. Clamp members 60 and 62 are fulcrumed, intermediately the ends thereof, with respect to the housing 64 by way of pivot pins 70 and 72 proximate the end of housing 64 from which the bifurcated arcuate ends 56 and 58 of clamp members 60 and 62 respectively project. Housing 64 is provided with a cavity 74 accepting clamping members 60 and 62 which are, at all times, biased by springs 76 and 78 so as to tend to be pivoted around fulcrum pins 70 and 72, respectively, such that their projecting bifurcated arcuate end portions 56 and 58 tend to be spread apart. However, a wedge member 80 is normally disposed between end surfaces 82 and 84 of clamp members 60 and 62, respectively, such that bifurcated end portions 56 and 58 thereof are closed together thereby clamping lever 10 solidly in position, as shown in FIGURE 5. Wedge member 80 is normally urged by means of spring 86 in a direction whereby it is wedged between surfaces 82 and 84 of clamp members 56 and 58. A pocket 88, formed in the body of wedge member 80 accepts the end of an actuating arm 90 operated by the rotatable plug of a lock such as cylinder lock 46 mounted in an appropriate bore in housing 64. When a key 50 is used to unlock lock 46 and to rotate the plug thereof with respect to the housing thereof, wedge member 80 is retracted, in a leftward direction as shown in the drawings, to the position shown in FIGURE 6, thus no longer engaging opposed surfaces 82 and 84 of clamp members 60 and 62, respectively, such that, under the action of springs 76 and 78, the clamp members pivot to the position indicated in FIGURE 6, thus causing their bifurcated arcuate ends 56 and 58 to spread apart sufficiently such that lever 10 is no longer clamped between the arcuate surfaces 66 and 68 and is freed for angular motion to any appropriate driving range position so as to appropriately shift the motor vehicle transmission.

As shown in FIGURE 7, any time lever 10 is brought back to an angular position corresponding to "park," lever 10 peripherally engages the innermost portions of concave arcuate surfaces 66 and 68 of the projecting bifurcated ends 56 and 58 of clamp members 60 and 62 such as to create a force directed in the direction of arrows 94 and 96 which, in view of fulcrum pivots 70 and 72 being placed beyond the point of application of the forces, cause clamping members 56 and 58 to pivot until their end surfaces 82 and 84 are spread far enough apart to permit wedge member 80 to project between the surfaces under the action of spring 86, thus automatically returning lock 46 to a locked condition, and effectively clamping lever 10 and immobilizing it in the angular position of FIGURES 4 and 5 corresponding to "park."

Some motor vehicles, although provided with so-called automatic transmissions, have their transmission shift or control lever mounted on the floor or on a pedestal disposed on the center of the floor in front of the front seat. Such a control lever is arranged to be angularly positionable to diverse driving mode positions, always remaining in the same plane. As shown in FIGURES 9 and 10, a floor or console mounted transmission control lever 10 is hollow and is generally provided with a spherical or ball handle portion 92 on the top of which projects, for example, a pushbutton 94 formed on the end of a rod 96 disposed substantially centrally to the hollow lever 10. In order to unlatch the control lever 10 for angular motion to the various driving range positions, pushbutton 94 must be first pressed so as to unlatch the lever 10 by means of plunger rod 96 actuating a latch cooperating with a quadrant rack or ratchet, not shown.

A sleeve 98 is disposed in sliding arrangement between rod 96 and the inner surface of hollow lever 10, the lower end of the sleeve being at all times urged upwardly, as seen in the drawing, by way of spring 100 disposed around rod 96 and held by means of retainer washer 102 affixed within lever 10. The upper end of sleeve 98 abuts below the shoulder portion 104 of pushbutton 94, and sleeve 98 is prevented from rotating by means of key 106 engaging appropriate keyways 108 and 110 in respectively the inner surface of hollow lever 10 and the outer surface of sleeve 98. A cylinder lock 46 is fastened within a boss portion 112 integrally formed in the periphery of lever 10 or attached thereto, and a radially disposed plunger 114 is adapted to radially engage aperture 116 through the wall of lever 10 and aligned aperture 118 through the wall of sleeve 98. Plunger 114 is provided with an obliquely disposed or helicoidal ramp portion 120 in which is engaged the cam portion 122 of a control or actuating member 124 operatively connected to the plug of lock 46.

When lock 46 in locked pin 114 is engaged in aperture 118 in sleeve 98 thus preventing longitudinal motion of the sleeve, with the result that the upper end of the sleeve engaging shoulder portion of pushbutton 94 prevents the pushbutton from actuating rod 96 to unlatch the transmission control lever 10. When lock 46 is unlocked by means of key 50 and the plug of the lock is rotated relatively the housing thereof, control or actuating member 124 is rotated and its cam 122 engaging helicoidal ramp 120 of plunger 114 retracts the plunger such that its inner end no longer projects into aperture 118 in sleeve 98. Consequently, sleeve 98 can be downwardly displaced against the force of return spring 100, and unlatching rod 96 can be actuated by pushbutton 94, thus releasing the transmission control lever for subsequent angular positioning to any appropriate driving range position.

Figure 12:
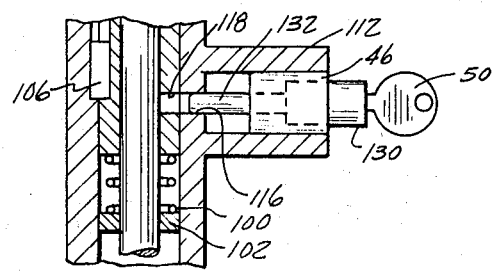
FIGURE 12 is a view similar to FIGURE 11, but showing the locking mechanism in an unlocked state.

FIGURES 11–12 represent a modification of the invention, substantially similar to the embodiment of FIGURES 9–10, but utilizing a lock element 46 provided with a plug 130 adapted to pop out to the position indicated in FIGURE 12 when the lock is unlocked by means of a key such as key 50. Plug 130 is adapted to carry a pin 132 mounted on the inner end thereof, so arranged that when the lock is unlocked, as shown at FIGURE 12, the end of pin 132 is no longer engaged in aperture 118 in sleeve 98. In order to lock the locking mechanism so as to prevent pushbutton 94 from being depressed to unlatch the transmission control or shift lever, plug 130 is manually pressed so as to force the plug back to the locked position of FIGURE 11, wherein the end of plunger 132 projects in aperture 118 in sleeve 98.

Figure 13:
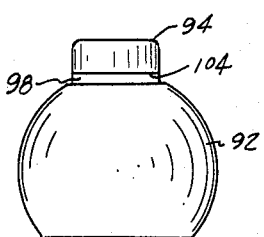
FIGURE 13 is a partial elevation view of a further modification of the invention.
Figure 14:
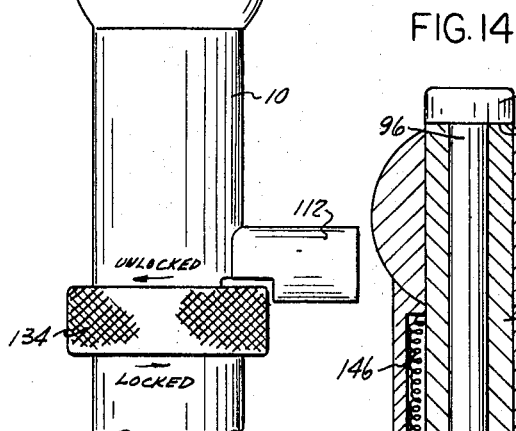
FIGURE 14 is a longitudinal sectional view of the modification of FIGURE 13 showing the locking mechanism in a locked state.
Figure 15:
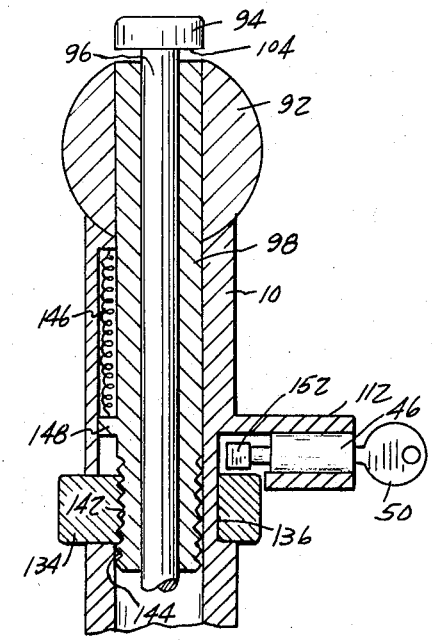
FIGURE 15 is a view similar to FIGURE 14, but showing the locking mechanism in an unlocked state.

The modification of FIGURES 13–15 consists principally of a manually rotatable ring 134, preferably made of two half rings assembled together by means of screws, not shown, for ease of assembling and disposed so as to engage a groove 136 disposed on the periphery of lever 10. Ring 134 has an inwardly projecting sector 138 projecting through a partial cut-out portion 140 through the wall of lever 10, the inwardly projecting sector being provided with an inner thread 142 mating with an outer thread 144 formed at the lower end of sleeve 98. Threads 142 and 144 have a substantial pitch such that a small angular rotation of ring 134 in one direction is sufficient to upwardly advance sleeve 98 to the position shown in FIGURE 14 whereby the end of the sleeve engages the shoulder portion 104 of pushbutton 94, while a small angular rotation in the opposite direction downwardly advances sleeve 98 such that the end of the sleeve no longer engages shoulder portion 104 of pushbutton 94 such that unlatching rod 96 may be actuated by depressing pushbutton 94, as shown in FIGURE 15. Each one of a plurality of substantially strong coil springs, such as shown at 146, is disposed between the end of hollow lever 10 proximate handle 92 and a shoulder like projecting portion 148 of sleeve 98 so as to normally urge the sleeve 98 to the position shown in FIGURE 15, as well as rotating ring 134 as the result of the substantial pitch or lead of the screw connection between the sleeve and the ring. Ring 134 is provided with a pocket 150 in which is engaged an eccentric 152 actuated by the plug of lock 46 when in the locked position of FIGURE 14. When a key, such as key 50, is used to unlock the plug of the lock with respect to its housing, rotation of the key causes rotation of the plug and rotation of eccentric 152 to the position shown in FIGURE 15, thus freeing ring 134 with the result that sleeve 98 may be displaced to the position of FIGURE 15 permitting pushbutton 94 to be manually depressed to unlatch the shift lever 10.

The lock element included in the combination of elements of the present invention may be any type of conventional lock and may be arranged, if so desired, to actuate the motor vehicle ignition switch, although it is evident that providing different locks for the transmission locking mechanism and for the ignition switch considerably increases the task of a would-be thief. It is obvious that, although the invention has been described and illustrated in applications to motor vehicles provided with so-called automatic transmissions, the same principles and the same structures are adaptable to motor vehicles equipped with non-automatic transmissions.

It is apparent that the preferred embodiments of the invention herein disclosed have been given for illustrative purpose only, and it would be appreciated by those skilled in the art that the invention is susceptible of many modifications, variations and changes.

What is claimed as novel is:

1. In combination:
   (a) an elongated, hollow, motor vehicle transmission control lever having an outer end, an inner end and an aperture between its ends and which is supported for angular displaced between positions associated with operative transmission conditions;
   (b) a sleeve internally mounted within the lever, said sleeve having an aperture between its ends, and being supported for slideable motion in a first direction toward the inner end of the lever from a first position, in which the aperture of the sleeve is aligned with the aperture of the lever, toward a second position that is spaced with respect to its first position;
   (c) spring means in said lever biasing the sleeve in the opposite, second direction toward its first position;
   (d) a rod disposed in said lever and supported by the sleeve, said rod being movable with respect to the lever from a first position, in which it prevents the lever from being angularly displaced, toward a second position, in which it allows the lever to be angularly displaced, by a motion in said first direction;
   (e) a pushbutton carried on the end of the rod in abutment with the end of the sleeve such that a motion of the pushbutton in the first direction is operable to move the rod and the sleeve toward their second positions, and motion of the sleeve, in its second direction and toward its first position, is operable to move the rod toward its first position;
   (f) a plunger with an inner end and an opposite, outer end, supported in the aperture of the lever for motion toward and away from the sleeve, said plunger being operable at such times as the sleeve is in its first position to be moved toward the sleeve and a locking position in which its inner end is seated in the aperture of the sleeve to lock the sleeve and the rod against motion toward their second positions;
   (g) a key-operated locking mechanism mounted on said lever and connected to the outer end of the plunger to move the plunger toward its locking position, and to move the plunger away from its locking position to allow the sleeve to be movable with respect to the lever.

2. The combination as defined in claim 1, including a key means mounted between the lever and the sleeve to limit longitudinal displacement of the sleeve with respect to the lever, to define the first position of the sleeve, and to prevent rotation of the sleeve with respect to the longitudinal axis of the lever.

3. The combination as defined in claim 1, including a ball-shaped handle having an opening, and being fixedly mounted on the outer end of the lever; and wherein the pushbutton is supported such that it extends beyond said handle when the sleeve is in its first position.

References Cited

UNITED STATES PATENTS

| | | | |
|---|---|---|---|
| 1,252,305 | 1/1918 | Runkle | 70—204 |
| 1,303,800 | 5/1919 | Jennings | 292—58 |
| 1,487,603 | 3/1924 | Ratto | 70—195 |
| 1,490,741 | 4/1924 | Hillburg | 70—204 |
| 2,679,744 | 6/1954 | Hildebrand | 70—202 |

FOREIGN PATENTS 462,940  4/1951  Italy.

RICHARD E. MOORE, *Primary Examiner.*

ROBERT L. WOLFE, *Assistant Examiner.*

U.S. Cl. X.R.

70—202, 247